(12) United States Patent
Lin

(10) Patent No.: US 9,956,818 B2
(45) Date of Patent: May 1, 2018

(54) METHOD FOR MAKING A COMPOSITE MATERIAL WHEEL RIM

(71) Applicant: Taiwan Hodaka Industrial Co., Ltd., Tainan (TW)

(72) Inventor: Shih Hung Lin, Tainan (TW)

(73) Assignee: Taiwan Hodaka Industrial Co., Ltd., Tainan (TW)

( * ) Notice: Subject to any disclaimer, the term of this patent is extended or adjusted under 35 U.S.C. 154(b) by 388 days.

(21) Appl. No.: 14/703,952

(22) Filed: May 5, 2015

(65) Prior Publication Data

US 2015/0251489 A1    Sep. 10, 2015

Related U.S. Application Data

(60) Continuation-in-part of application No. 13/602,441, filed on Sep. 4, 2012, now abandoned, which is a
(Continued)

(30) Foreign Application Priority Data

Oct. 14, 2008    (TW) ............................ 97218351 U

(51) Int. Cl.
*B32B 38/00* (2006.01)
*B60B 21/06* (2006.01)
(Continued)

(52) U.S. Cl.
CPC ............ *B60B 21/064* (2013.01); *B32B 37/18* (2013.01); *B32B 38/0004* (2013.01);
(Continued)

(58) Field of Classification Search
CPC ..... B60B 21/025; B60B 21/04; B60B 21/062; B60B 21/064; B60B 5/02; B60B 25/00; B60B 38/0004; B60B 38/0012; B60B 37/18; B60B 1/044; B60B 2310/228; B60B 2310/242; B60B 2360/3416;
(Continued)

(56) References Cited

U.S. PATENT DOCUMENTS 5,975,645 A    11/1999 Sargent
6,991,298 B2    1/2006 Ording et al.
(Continued)

*Primary Examiner* — Jacob Cigna
*Assistant Examiner* — Lee A Holly
(74) *Attorney, Agent, or Firm* — Alan D. Kamrath; Kamrath IP Lawfirm, P.A.

(57) ABSTRACT

A method for making the composite material wheel rim includes the steps of: configuring a plurality of inner lining chunks individually to the desired position where the spokes are to be mounted to allow the inner lining chunks to be integrated with an inner annular portion of the wheel rim, next, integrating the formed inner annular portion with an outer annular portion of the wheel rim to form a semi-finished wheel rim, and then, creating the requested threaded holes for connecting the spokes in the inner lining chunks of the inner surface of the semi-finished wheel rim subject to the requested amount and angles of the spokes. By the present method, the semi-finished wheel rim allows drilled, threaded holes subject to needs to fit different types of wheel hub units to increase the yield rate and reduce the inventory of the wheel rims.

4 Claims, 6 Drawing Sheets

Related U.S. Application Data division of application No. 12/588,378, filed on Oct. 14, 2009, now abandoned.

(51) Int. Cl.

| | | |
|---|---|---|
| *B32B 37/18* | (2006.01) | |
| *B60B 5/02* | (2006.01) | |
| *B60B 21/02* | (2006.01) | |
| *B60B 21/04* | (2006.01) | |
| *B60B 25/00* | (2006.01) | |
| *B60B 1/04* | (2006.01) | |

(52) U.S. Cl.
CPC ............ *B32B 38/0012* (2013.01); *B60B 5/02* (2013.01); *B60B 21/025* (2013.01); *B60B 21/04* (2013.01); *B60B 21/062* (2013.01); *B60B 25/00* (2013.01); *B32B 2305/18* (2013.01); *B32B 2605/00* (2013.01); *B60B 1/044* (2013.01); *B60B 2310/228* (2013.01); *B60B 2310/242* (2013.01); *B60B 2360/3416* (2013.01); *Y10T 29/49506* (2015.01); *Y10T 29/49526* (2015.01); *Y10T 156/1002* (2015.01)

(58) Field of Classification Search
CPC ........... B32B 2305/18; Y10T 156/1002; Y10T 29/49506; Y10T 29/49526
See application file for complete search history.

(56) References Cited

U.S. PATENT DOCUMENTS

| | | |
|---|---|---|
| 7,331,639 B2 * | 2/2008 | Okajima ................. B60B 1/041 301/58 |
| 7,377,595 B1 | 5/2008 | Okajima et al. |
| 7,464,994 B2 | 12/2008 | Okajima et al. |
| 2005/0017569 A1 * | 1/2005 | Passarotto ............... B60B 1/003 301/58 |
| 2005/0156461 A1 | 7/2005 | Chiang et al. |
| 2005/0194834 A1 | 9/2005 | Chen |
| 2007/0102995 A1 | 5/2007 | Okajima |
| 2007/0194619 A1 * | 8/2007 | Colegrove ................ B60B 5/02 301/95.101 |
| 2008/0174168 A1 | 7/2008 | Yang |
| 2010/0090519 A1 | 4/2010 | Lin |

\* cited by examiner

METHOD FOR MAKING A COMPOSITE MATERIAL WHEEL RIM

CROSS REFERENCE TO RELATED APPLICATIONS

This application is a continuation-in-part of U.S. patent application Ser. No. 13/602,441 entitled "Composite Material Wheel Rim Structure" and filed on Sep. 4, 2012, now abandoned.

BACKGROUND OF THE INVENTION

Field of the Invention

The present invention relates to a method for making a composite material wheel rim and, in particular, to a method of making the wheel rim providing drilled threaded holes after it is fully formed according to the spoke amount of the requested wheel hub and the assembled angle of each spoke to fit different types of wheel hub units to increase the yield rate and reduce the inventory of the wheel rims.

Description of the Prior Art

To equalize the spoke tension of a bicycle wheel unit, generally, the wheel unit is radially arranged with a plurality of spokes for connecting the wheel rim of the wheel unit and the wheel hub. Not all the assembled angles of the spokes are the same, so that the connecting position of each spoke at the inner surface of the wheel rim needs to be drilled with the threaded hole in compliance with the orientation angle of each spoke to fit and connect each spoke. A prior art method of making a wheel rim, such as the method disclosed in US 2007/0102995 (hereafter the prior art case), involves: (a) forming an annular metallic rim member (annular metallic rim member 22); (b) bonding a plurality of reinforcement members (reinforcement members 23) providing pre-formed threaded holes with different angles (threaded bore 23c) to the inner surface of the annular metallic rim member (annular metallic rim member 22) by adhesive, with the bonded positions of the reinforcement members and the angle of the individual threaded hole which each bonded position requires configured according to the requested spoke amount of the wheel hub and the orientation angles of the discrete spokes; (c) using the adhesive attachment materials or sheets (adhesive attachment materials or sheets 24) to overlie all of the plurality of reinforcement members to integrate the reinforcement members with the annular metallic rim member; and (d) using a drill to individually drill the opening of the pre-formed threaded hole (threaded bore 23c) in each reinforcement member covered by the adhesive attachment materials or sheets, such that the wheel rim disclosed in the prior art case is completed.

However, the prior art case described above has deficiencies in manufacturing as follows:

(I) The reinforcement members (reinforcement members 23) disclosed in the prior art case involve diverse reinforcement members with various angles of threaded holes, so that the diverse reinforcement members need to be separated from one another carefully. Otherwise, it is easy to mix and result in using incorrectly. Thus, the pressure of the storage administrator in inventory management may increase during stock preparation.

(II) Basically, different threaded holes provide different spoke assembled angles, so that each reinforcement member with a threaded hole should be placed at an accurate position fitting the orientation angle of the spoke mating with it when the wheel rim is completely formed. If one of them is arranged wrongly, the wheel rim may become a defective unit which can not be used. Alternately, if the reinforcement member is disposed correctly but is positioned in an inaccurate direction, that causes the threaded hole to provide an incorrect angle, so that the wheel rim also becomes a defective unit. Therefore, the prior art case has the drawback of high product defect rate.

(III) The wheel rim disclosed in the prior art case can only be applied to the type of wheel hub with which the wheel rim allows to mate. That is, other types of wheel hubs can not fit such a wheel rim, and, thus, different types of wheel rims need to be stocked separately, so that the inventory cost of the wheel rims is increased.

SUMMARY OF THE INVENTION

It is a primary of objective of the present invention to provide a method for making a composite material wheel rim, and the method involves configuring and securing a plurality of inner lining chunks for connecting the spokes to the inside of the wheel rim. The plurality of inner lining chunks provides no pre-drilled threaded holes before being fixed inside the wheel rim. After a semi-finished wheel rim is fully formed, the semi-finished wheel rim is allowed to be drilled with threaded holes according to the amount of the spokes of the wheel hub that the consumer requests and the assembled angle of each spoke.

In order to achieve the aforesaid objective, the present invention is characterized by disposing a plurality of inner lining chunks without pre-drilled threaded holes individually to the desired positions where the spokes are to be mounted to allow the inner lining chunks to be integrated with an inner annular portion of the wheel rim, next, integrating the formed inner annular portion with an outer annular portion of the wheel rim to form a semi-finished wheel rim, and then, creating the requested threaded holes for connecting the spokes in the inner lining chunks of the inner surface of the semi-finished wheel rim subject to the requested amount of the spokes and the assembled angle of each spoke. By the present method, the fully-formed semi-finished wheel rim can be drilled with threaded holes subject to the spoke mount of the requested wheel hub to fit different types of wheel hub units to increase the yield rate and reduce the inventory of wheel rims.

BRIEF DESCRIPTION OF THE DRAWINGS

In order that the present invention may be more fully understood, preferred embodiments thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, wherein preferred embodiments of the present invention are disclosed.

Figure 1:
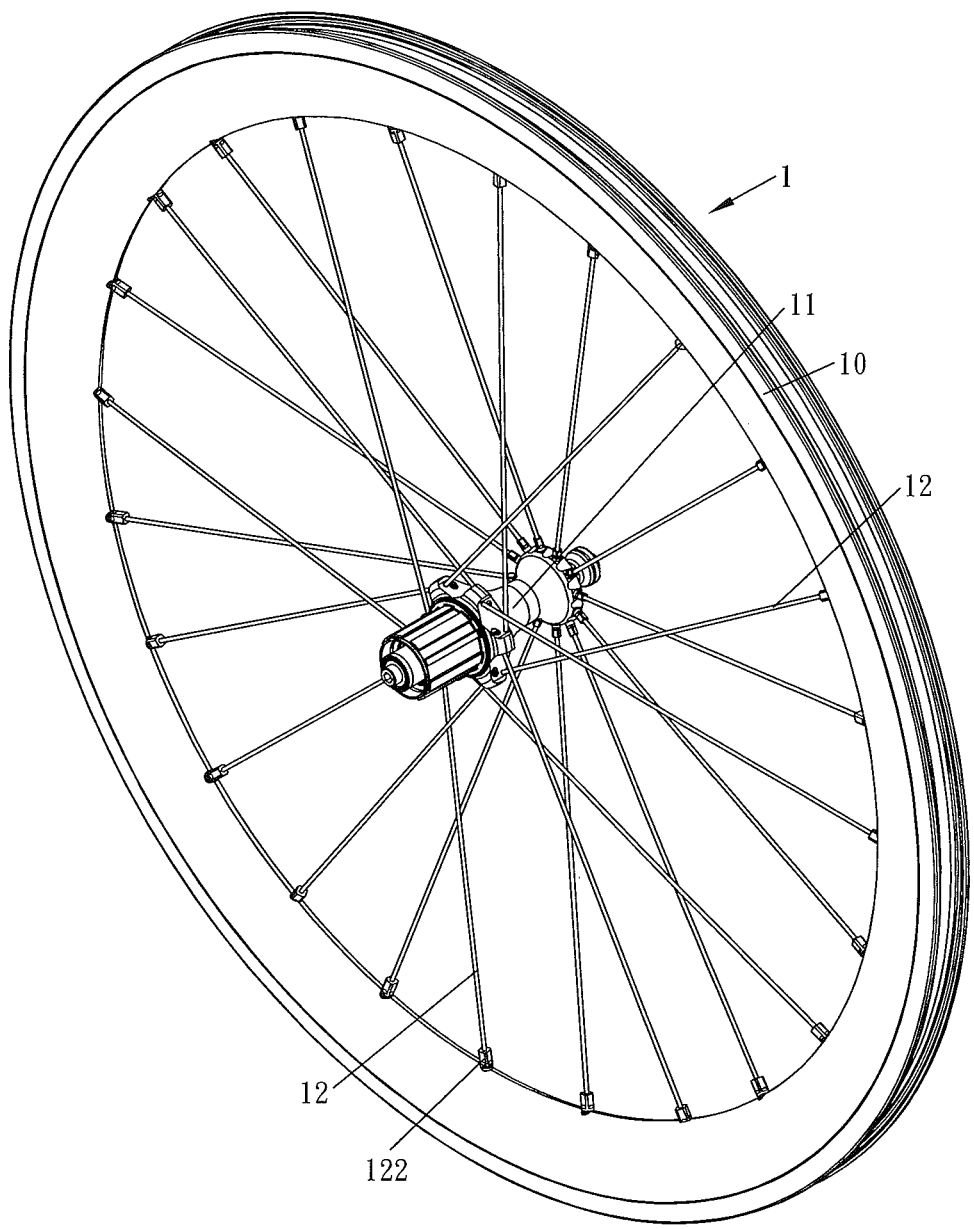
FIG. 1 is a stereogram of the wheel rim unit according to the embodiment of the present invention.
Figure 2:
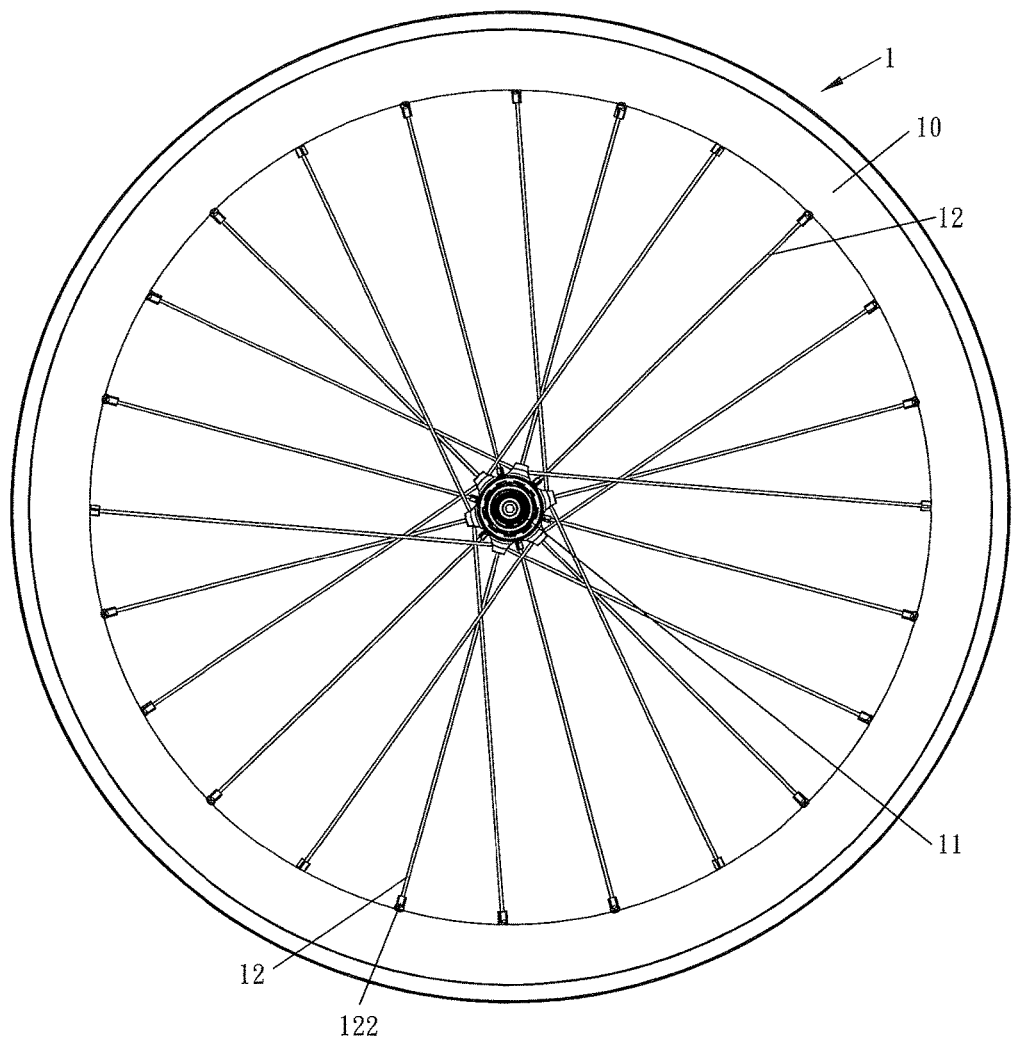
FIG. 2 is a front view of the wheel rim unit according to the embodiment of the present invention.
Figure 3:
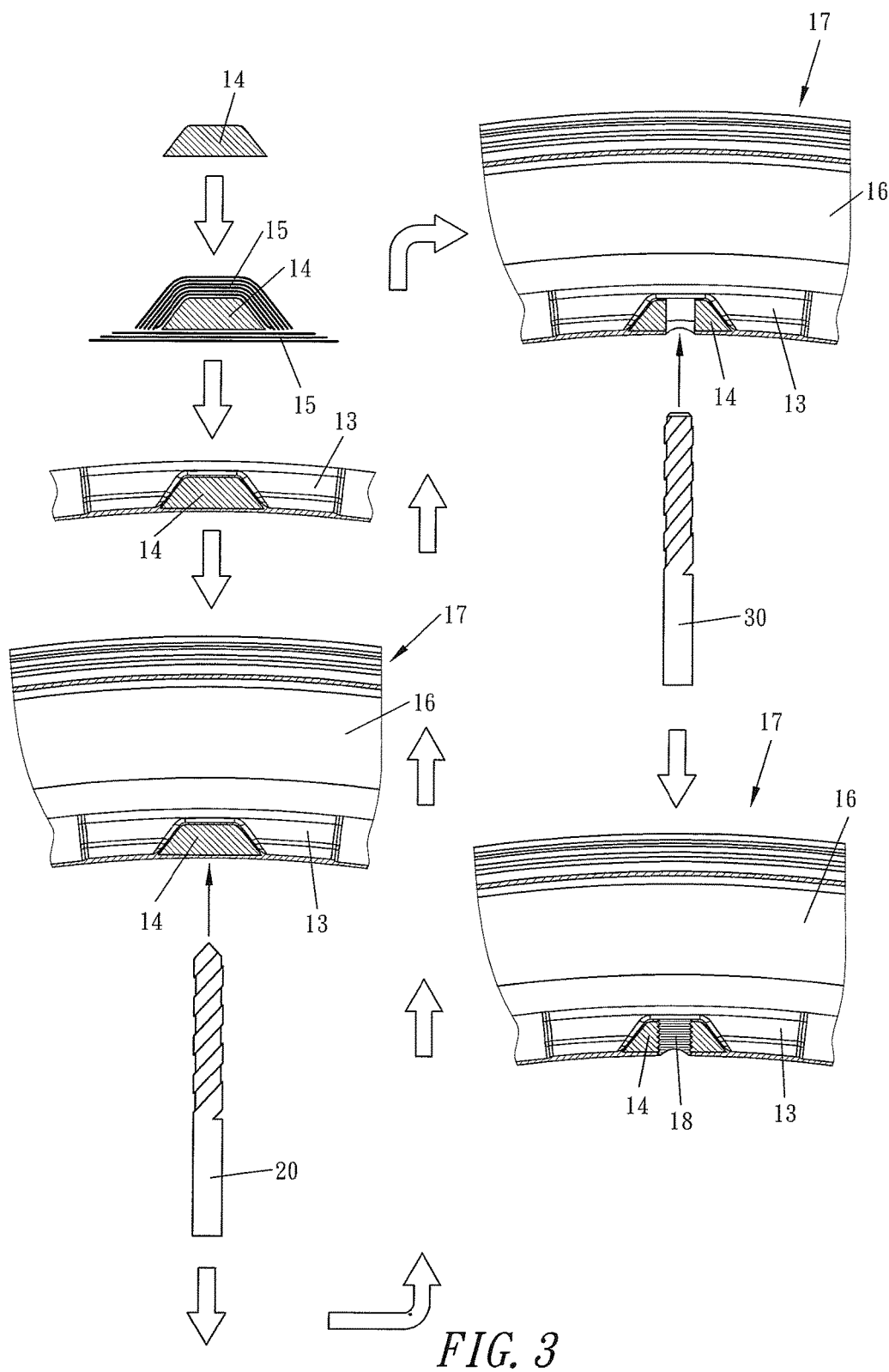
FIG. 3 is a diagram showing the process steps involved in making the composite material wheel rim according to the embodiment of the present invention.
Figure 4:
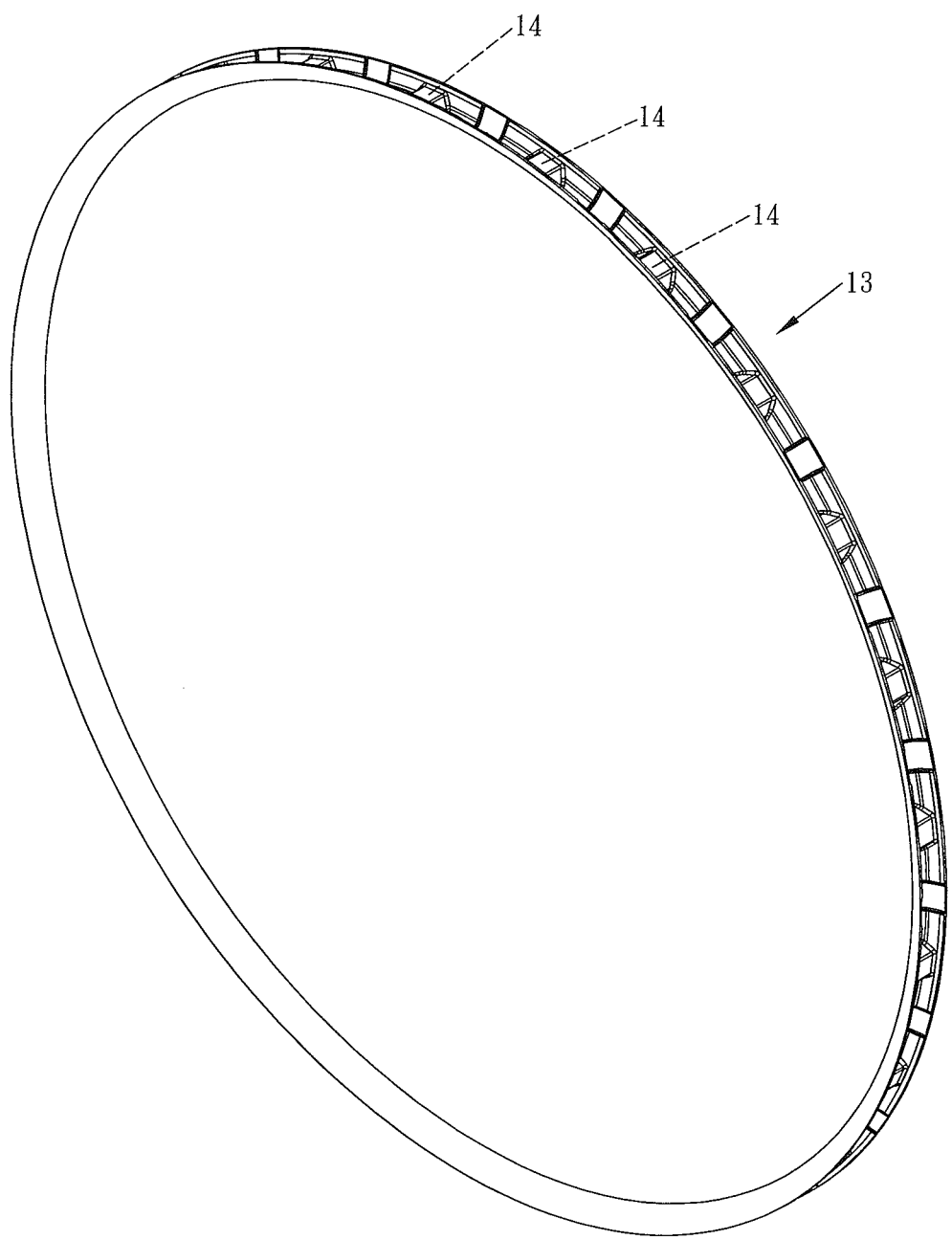
FIG. 4 is a stereogram showing the appearance of the semi-finished wheel rim according to the embodiment of the present invention.
Figures 5, 6, 7:
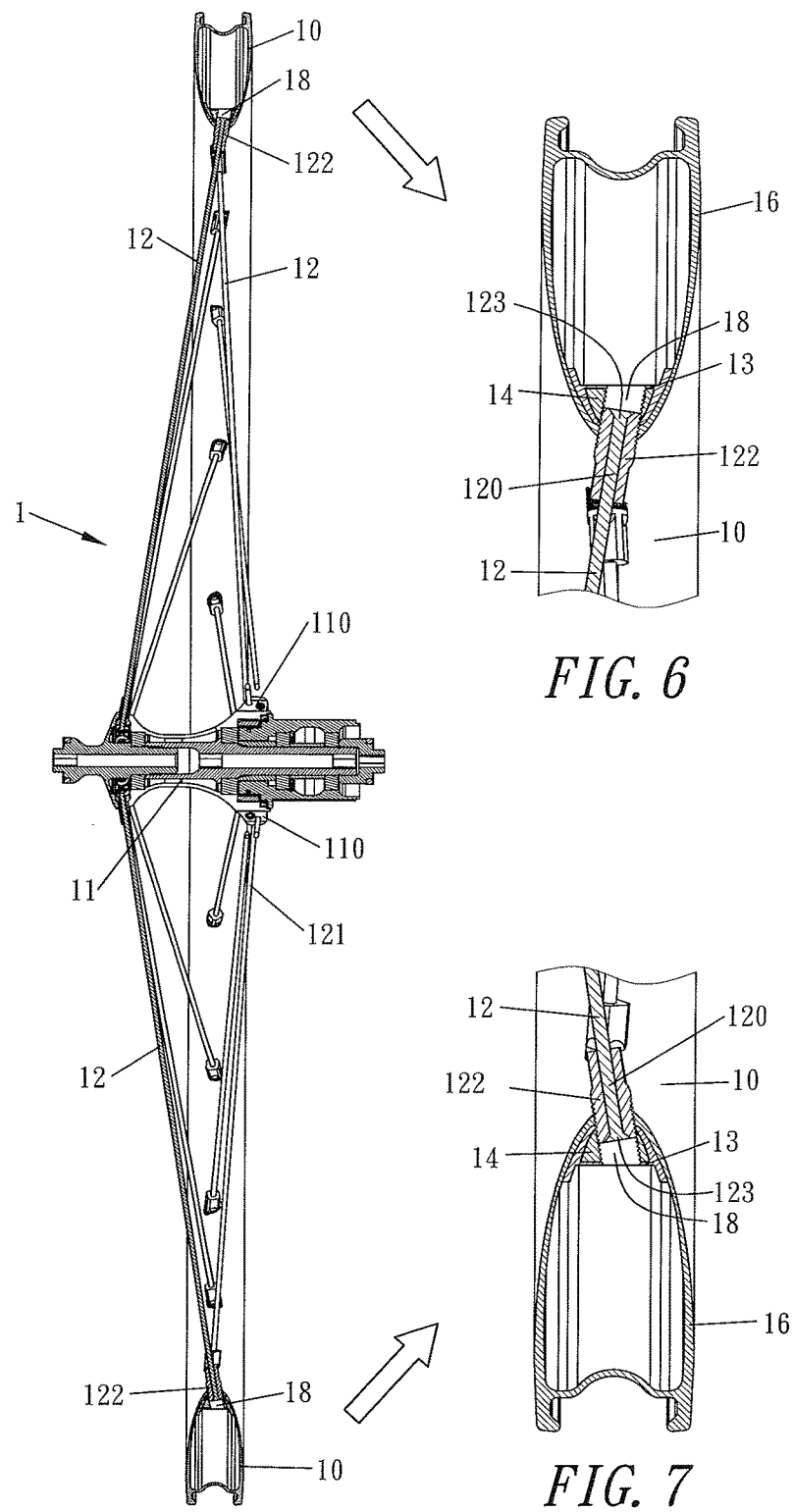
FIG. 5 is a front cross-sectional view of the wheel rim unit according to the embodiment of the present invention.
FIG. 6 is a first partially enlarged view of FIG. 4.
FIG. 7 is a second partially enlarged view of FIG. 4.
Figure 9:
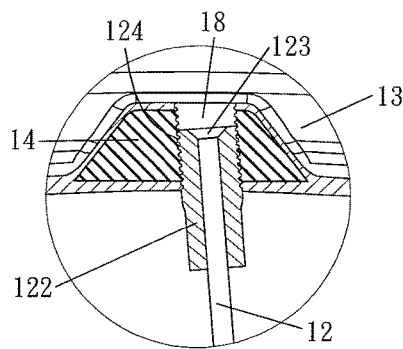
FIG. 9 is an enlarged view of A shown in FIG. 8.
Figure 10:
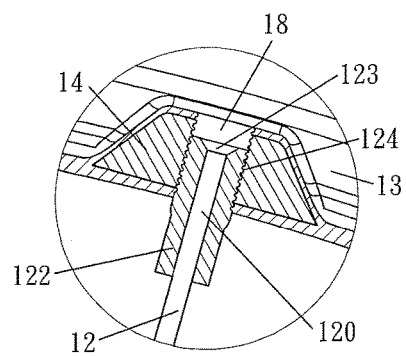
FIG. 10 is an enlarged view of B shown in FIG. 8.
Figure 8:
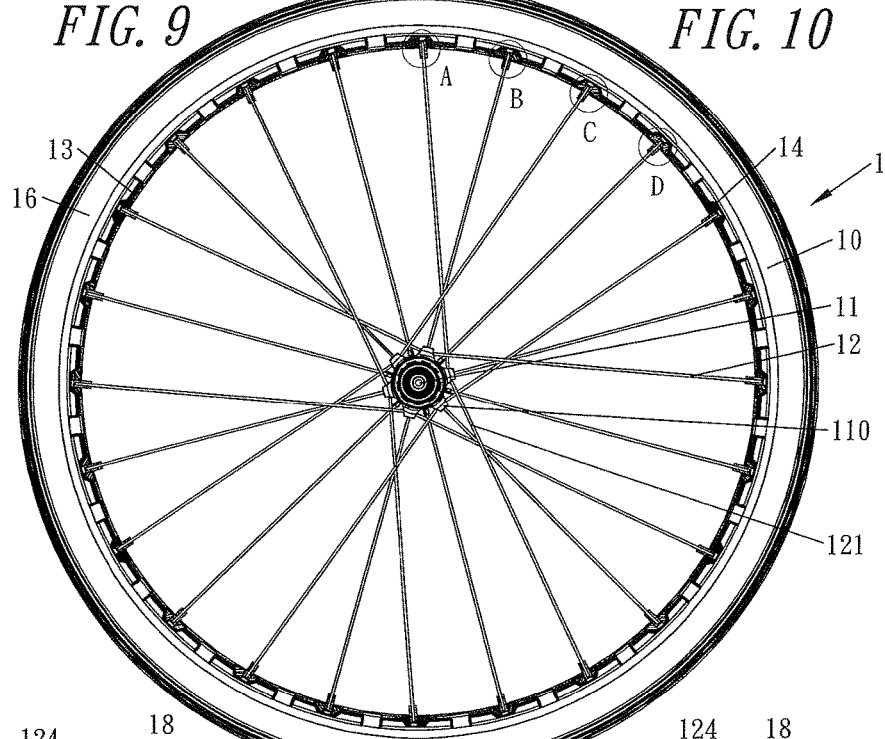
FIG. 8 is a side cross-sectional view of the wheel rim unit according to the embodiment of the present invention.
Figure 11:
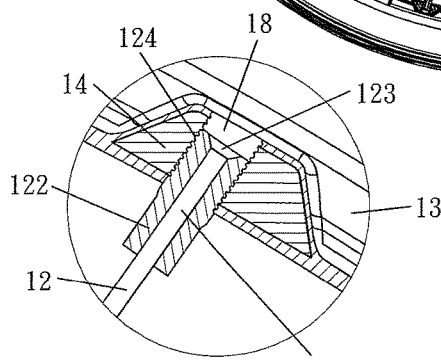
FIG. 11 is an enlarged view of C shown in FIG. 8.
Figure 12:
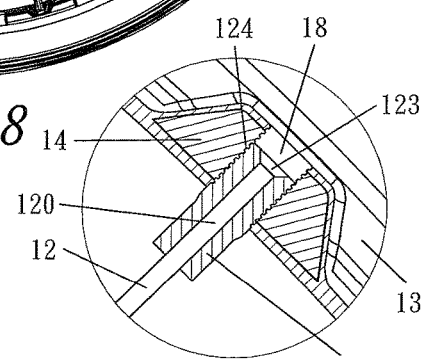
FIG. 12 is an enlarged view of D shown in FIG. 8.

Referring to FIG. 1 to FIG. 3, the bicycle wheel unit 1 includes a wheel rim 10, a wheel hub 11 and a plurality of spokes 12. The wheel hub 11 is arranged at the center of the wheel rim 10. Moreover, each spoke 12 has one end connected with the inner surface of the wheel rim 10 and the other end connected with the outer edges of both ends of the wheel hub 11. A method for making the composite material wheel rim 10 disclosed in the present invention, as shown in FIG. 3, comprises the steps of:

(a) placing a plurality of inner lining chunks 14, which are metallic material and provide no pre-drilled threaded holes, in a first mold. The first mold is used for forming an inner annular portion 13 of the wheel rim 10. According to the desired position where each spoke 12 is to be mounted, a laminate-stacking carbon fiber cloth 15, that the inner lining chunks 14 are encased in, is processed by thermally pressing and hardening to form the inner annular portion 13 of the wheel rim 10, as shown in FIG. 4. The plurality of inner lining chunks 14 is fixed within the inner annular portion 13.

(b) placing the fully-formed inner annular portion 13 made in step (a) in a second mold used for forming an outer annular portion 16 of the wheel rim 10, stacking carbon fiber cloth 15 onto the outer side of the inner annular portion 13 after aligning the alignment point, and processing the combination of the inner annular portion 13 and the outer annular portion 16 by thermally pressing and hardening to form a semi-finished wheel rim 17.

(c) using a drilling tool 20 and a thread tapping tool 30 to create the requested tapped holes in the inner lining chunks 14 inside the semi-finished wheel rim 17 to form threaded holes 18 subject to the amount of the spokes 12 configured to the arranged wheel hub 11 and the assembled angle of each spoke 12. The threaded holes 18 are drilled and tapped from the inner surface of the semi-finished wheel rim 17 toward the inner lining chunks 14, such that a wheel rim 10 is fully formed and such that the manufacturing process of the wheel rim 10 is completed.

The amount of the threaded holes and the drilled angle of each threaded hole 18 may be altered to correspond with the amount of the spokes 12 of the aforementioned wheel hub 11 and the assembled angle of each spoke 12. Referring to FIG. 5 to FIG. 8, one end of the spoke 12 is provided with a first end 120 connected with the wheel rim 10, and the other end of the spoke 12 provides a second end 121 secured to a fixed protruding member 110 arranged to the outer edges of both ends of the wheel hub 11. The first end 120 has an outward-enlarged head 123. After the spoke 12 is inserted through a hollow adjusting element 122, the adjusting element 122 is confined to the spoke 12 by the head 123. The outer wall of the adjusting element 122 provides an external thread section 124 allowed to be screwed to the threaded hole 18, as shown in FIG. 9 to FIG. 12, so that the first end 120 of the spoke 12 is connected with the threaded hole 18 of the wheel rim 10. Moreover, the adjusting element 122 is allowed to be adjusted axially in the interior of the threaded hole 18 to adjust the pulling force of the spoke 12.

After being fully formed, the semi-finished wheel rims 17 may be stored. Then, according to the amount of the spokes 12 of the wheel hub 11 that the consumer requests and the assembled angle of each spoke 12, the inner lining chunks 14 inside the semi-finished wheel rim 17 are individually drilled with a hole by the drilling tool 20, and each hole is tapped with threads by the thread tapping tool 30 to form threaded holes 18. Thus, the wheel rim 10 is fully formed, and the manufacturing process of the wheel rim 10 is completed. The threaded holes drilling may employ a laser to mark the positions of the threaded holes, and the NC or CNC machine tool is used to drill holes and tap threads to not only enable the space between the threaded holes and the angle of each hole to be drilled precisely but also to permit numerous holes to be drilled at a time.

The method for making the composite material wheel rim disclosed in the present invention provides advantages and functions as follows:

(I) Before being integrated with the inner annular portion 13, each inner lining chunk 14 provides no pre-drilled threaded hole. That is, the inner lining chunks 14 are individually drilled with a hole and tapped with threads after the semi-finished wheel rim 17 is formed. Moreover, the threaded holes are created subject to the amount of spokes 12 amount of the wheel hub 11 that the consumer requests and the assembled angle of each spoke 12. Consequently, the manufacturers have no need to stock different inner lining chunks 14 with different angles of threaded holes or different types of wheel rims for different types of wheel hubs, so that the produce cost and the inventory cost can be reduced to increase the business competitive advantage.

(II) The method disclosed in the present invention avoids not only the problem in storage management and the complexity and difficulty of the production process but also the errors of wrongly arranging the reinforcement members to the rims occurring in the aforesaid prior art case. Besides, the present method also avoids the carelessness in income quality control (IQC), in-process quality control (IPQC), and outgoing quality control (OQC) to reduce the working hours for inspection. Thus, the production process is allowed to be managed effectively.

(III) The method disclosed in the present invention not only reduces the working hours and the burden of the operation personnel but also increases the product accuracy and the yield rate (non-defective unit rate) to enhance the products competitive advantage.

(IV) The drilling of threaded holes disclosed in the present invention may employ a laser to mark the positions of holes and may use the NC or CNC machine tool to drill holes and tap threads, so that the space between the threaded holes and the angle of each drilled hole can be extremely precise to meet the product standard. Besides, employing such tools allows numerous holes to be drilled at a time.

(V) The threaded holes disclosed in the present invention are created after the semi-finished wheel rim 17 is formed, so that each threaded hole provides an extremely accurate position and angle to allow the adjusting element 122 of each spoke 12 to be screwed to the inner lining chunk 14 more tightly without being loose or dropping off, to ensure the products safety in use to benefit the riders.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

What is claimed is:

1. A method for making a composite material wheel rim, comprising:

forming an annular portion of a wheel rim in a first mold;

placing a plurality of inner lining chunks individually to a desired position on the annular portion where each spoke is to be mounted, wherein the plurality of inner lining chunks is metallic material;

laminate-stacking carbon fiber cloth to enable the plurality of inner lining chunks to be encased to form an inner annular portion of the wheel rim;

placing the formed inner annular portion in a second mold and forming an outer annular portion of the wheel rim in the second mold by stacking carbon fiber cloth onto an outer side of the formed inner annular portion, and processing a combination of the formed inner annular portion and the outer annular portion to form a semi-finished wheel rim; and according to a spoke amount of a wheel hub and an assembled angle of each spoke, drilling and tapping holes in the plurality of inner lining chunks of an inner surface of the semi-finished wheel rim to form threaded holes.

2. The method for making the composite material wheel rim as claimed in claim 1, wherein an amount and drilled angles of the threaded holes correspond with the spoke amount of the wheel hub and the assembled angle of each spoke.

3. The method for making the composite material wheel rim as claimed in claim 1, wherein one end of each spoke is provided with a first end connected with the semi-finished wheel rim and another end of each spoke provides a second end secured to a fixed protruding member arranged on an outer edge of the wheel hub; wherein the first end has an outward-enlarged head, wherein the spoke is inserted through a hollow adjusting element, wherein the hollow adjusting element is confined to each spoke by the outward-enlarged head; and wherein an outer wall of the hollow adjusting element provides an external thread section screwed to a corresponding threaded hole.

4. The method for making the composite material wheel rim as claimed in claim 3, wherein the threaded holes are formed by employing a laser to mark positions of the holes and using an NC machine tool to drill the holes and tap threads.

* * * * *